United States Patent
Tang et al.

(10) Patent No.: US 9,384,202 B1
(45) Date of Patent: Jul. 5, 2016

(54) GATEWAY MODULE TO ACCESS DIFFERENT TYPES OF DATABASES

(71) Applicants: Joshua K. Tang, San Luis Obispo, CA (US); Erick C. Pierce, Atascadero, CA (US); Gavin R. Prestwood, San Luis Obispo, CA (US); Travis McMillon, San Luis Obispo, CA (US); Tor Edward Swanson, Santa Margarita, CA (US)

(72) Inventors: Joshua K. Tang, San Luis Obispo, CA (US); Erick C. Pierce, Atascadero, CA (US); Gavin R. Prestwood, San Luis Obispo, CA (US); Travis McMillon, San Luis Obispo, CA (US); Tor Edward Swanson, Santa Margarita, CA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 13/632,865

(22) Filed: Oct. 1, 2012

(51) Int. Cl.
G06F 17/30 (2006.01)

(52) U.S. Cl.
CPC ................ G06F 17/30094 (2013.01)

(58) Field of Classification Search
CPC .......... G06F 17/3056; G06F 17/30289; G06F 17/30557; G06F 17/30427; G06F 17/30563; G06F 17/30569
USPC ............. 707/1, 3, 4, 10, 100, 999.1, 999.001, 707/999.003, 999.004, 781, 999.009, 707/999.102
See application file for complete search history.

(56) References Cited

U.S. PATENT DOCUMENTS

| | | | |
|---|---|---|---|
| 6,269,365 B1 * | 7/2001 | Kiyoki et al. | 707/602 |
| 6,442,548 B1 * | 8/2002 | Balabine et al. | |
| 6,601,072 B1 * | 7/2003 | Gerken, III | |
| 6,651,072 B1 * | 11/2003 | Carino et al. | |
| 2002/0107840 A1 * | 8/2002 | Rishe | 707/3 |
| 2003/0033317 A1 * | 2/2003 | Ziglin | 707/102 |
| 2003/0065662 A1 * | 4/2003 | Cosic | 707/9 |
| 2005/0108206 A1 * | 5/2005 | Lam et al. | 707/3 |
| 2005/0182795 A1 * | 8/2005 | Murthy | 707/200 |
| 2005/0234889 A1 * | 10/2005 | Fox et al. | 707/3 |
| 2005/0240565 A1 * | 10/2005 | Kapitanski et al. | 707/1 |
| 2006/0173873 A1 * | 8/2006 | Prompt et al. | 707/100 |
| 2008/0319958 A1 * | 12/2008 | Bhattacharya et al. | 707/4 |
| 2009/0132503 A1 * | 5/2009 | Sun et al. | 707/4 |
| 2010/0114841 A1 * | 5/2010 | Holenstein et al. | 707/690 |

(Continued)

OTHER PUBLICATIONS

Susan D. Urban and Taoufik Ben Abdelliatif; An Object-Oriented Query Language Interface to Relational Databases in a Multidatabase Database Environment; Jun. 24, 1994.*

(Continued)

*Primary Examiner* — James Trujillo
*Assistant Examiner* — John J Morris
(74) *Attorney, Agent, or Firm* — Shiv S. Naimpally; Lee & Hayes, PLLC

(57) ABSTRACT

Some implementations may include a gateway module to receive, from a software application, a command to perform an action to a database. The gateway module may translate the command to create a translated command based on configuration data associated with the database. The configuration data may enable the gateway module to determine how to perform the action to the database. The gateway module may determine whether the translated command is valid based on the configuration data. If the translated command is valid, the gateway module may send the translated command to the database. The gateway module may receive a result of performing the translated command from the database. The gateway module may determine, based on the translated command, the result, or both, whether conditions associated with a triggered command are satisfied (e.g., met). If the conditions are satisfied, the gateway module may send the triggered command to the gateway module.

25 Claims, 9 Drawing Sheets

(56) References Cited

U.S. PATENT DOCUMENTS

| | | | |
|---|---|---|---|
| 2011/0010379 A1* | 1/2011 | Gilderman et al. | 707/759 |
| 2011/0060769 A1* | 3/2011 | Mohan | 707/803 |
| 2011/0258179 A1* | 10/2011 | Weissman et al. | 707/714 |
| 2012/0265742 A1* | 10/2012 | Burckhardt et al. | 707/694 |

OTHER PUBLICATIONS

Sonia Bergamaschi, Alessandra Garuti, Claudio Sartori, and Alberto Venuta; Object Wrapper: an Object-Oriented Interface for Relational Databases; Sep. 4, 1997.*

* cited by examiner

GATEWAY MODULE TO ACCESS DIFFERENT TYPES OF DATABASES

BACKGROUND

Databases may be implemented in variety of ways. For example, a database may be implemented as a relational database in which data is organized based on relationships between the various pieces of data. Of course, a database may be implemented in other ways, such as a hierarchical database, an object oriented database, etc.

Software applications may be written to access one or more databases. Each software application may include commands written in a format that is specific to a particular database. For example, each software application may be written specifically for the databases that the software application will be accessing. When a system migrates from a first type of database (e.g., a relational database) to a second type of database (e.g., a non-relational database), the software applications that wrote to the first type of database must be rewritten to access the second type of database. Rewriting multiple software applications may be time-consuming and/or expensive.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The systems and techniques described herein may be used to provide a gateway module to enable software applications to access one or more databases. The gateway module may be a software application that provides a single, unified interface for reading data from and writing data to the one or more databases. The gateway module may receive commands in a simple format that does not reference how the databases are organized. Thus, the gateway module may hide the organization details associated with each of the databases from the software applications. For example, when the software applications send commands to the gateway module, the software applications may be unaware of the types of databases that are being accessed or how the databases are organized. To illustrate, the databases that the gateway module provides access to may include relational databases, non-relational databases, and/or other types of databases. The software applications may send simple commands (e.g., commands that do not reference how the database is organized) to the gateway module, such as read a specified field, write a specified field, modify a specified field, and the like. The gateway module may have access to configuration data associated with each database and may translate a command received from a software application into a translated command that references the organization of the data in the database that is being accessed. For example, the configuration data may identify how different pieces of data from each database may be accessed, how to perform a write to a field of each database, how to perform a read of a field of each database, etc.

Thus, the software applications may send commands to the gateway module to perform various actions to the databases. The gateway module may translate each command based on the configuration data associated with each database to perform the various actions to the databases. The gateway module may enable a database to be migrated from one type of database to another type of database without the software applications being rewritten because the software applications communicate directly with the gateway module rather than with the databases. The gateway module may enable software applications to access different types (e.g., relational, non-relational, etc.) of databases without the software applications being aware of how data is organized in each of the different types of databases.

Illustrative Architectures

Figure 1:
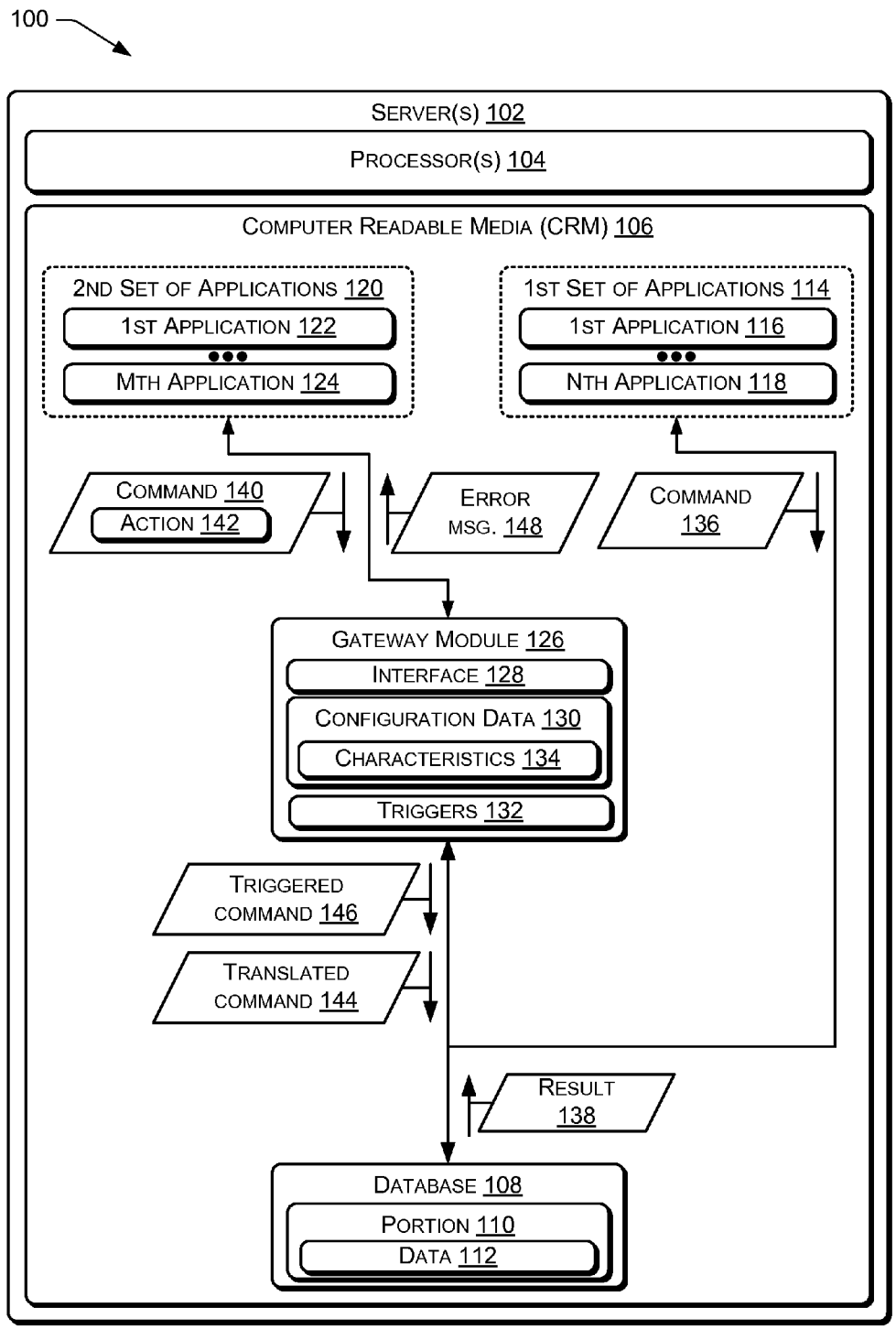
FIG. 1 is an illustrative architecture that includes a first set of applications that directly access a database while a second set of applications access the database using a gateway module according to some implementations.

FIG. 1 is an illustrative architecture 100 that includes a first set of applications that directly access a database and a second set of applications that use a gateway module to access the database according to some implementations.

The architecture 100 may include one or more servers 102. Each of the servers 102 may include one or more processors 104 and one or more computer readable media 106. The computer readable media 106 may include a database 108. The database 108 may include multiple portions (e.g., tables, rows, columns, fields, and the like), such as a representative portion 110. Each portion of the database 108 may be used to store data. For example, data 112 may be stored in the portion 110. In some implementations, the database 108 may include more than one database.

The database 108 may be directly accessed by a first set of applications 114 that include N software applications (N>1), such as a first application 116 to an Nth application 118. A second set of applications 120 may include M software applications (M>1), such as a first application 122 to an M application 124. The second set of applications 120 may access the database 108 using a gateway module 126.

The gateway module 126 may include an interface 128, configuration data 130, and one or more triggers 132. The configuration data 130 may include one or more characteristics 134 associated with various portions of the database 108, such as the portion 110. In some implementations, the configuration data 130 may include the triggers 132. The interface 128 may use the configuration data 130 to translate commands received from the second set of applications 120 into commands that are capable of being executed on the database 108. For example, the interface 128 may translate commands written in a first language (e.g., a lightweight data-interchange format that is similar to JavaScript Object Notation) into commands that are suitable for a specific type of database, such as a relational database, a not only structured query language (NoSQL) database, another type of database, or any combination thereof. The characteristics 134 may describe how data is organized in a database 108, how various portions, such as the portion 110, may be accessed (e.g., read from, written to, etc.), and other information associated with the database 108. The configuration data 130 may also include business rules associated with various portions of the database 108. For example, an inventory table may include a price field associated with item in inventory. The configuration data 130 may indicate that the price field has a numeric-only characteristic. The configuration data 130 may also include a business rule that specifies that the contents of the price field be within a range specified by a minimum price and a maximum price. The gateway module 126 may use the business rule to prevent an application from writing an amount, such as zero or a negative number, to the price field. In this example, zero or a negative number may be valid for writing to a numeric-only field. Thus, the business rules may further define characteristics of various portions of the database 108.

The triggers 132 may describe conditions which, when met, may trigger one or more additional commands. For example, one of the triggers 132 may specify that when a particular field is written to, a particular (e.g., triggered) command is to be performed. To illustrate, when a field of a table is modified, the triggered command may write to a log file indicating that the particular field was modified. As another illustration, when a new entry is added to one table, the triggered command may add a new entry to one or more other tables. As yet another illustration, when an entry is modified in one table, the triggered command may modify other entries in other tables. In some cases, a triggered command may trigger one or more additional commands. For example, a first command may trigger a second command, the second command may trigger a third command, and so on.

In some implementations, the first set of applications 114 may directly access the database 108. For example, the first set of applications 114 may send a command 136 directly (e.g., without using the gateway module 126) to the database 108. The command 136 may use a format and/or instructions that the database 108 is capable of interpreting. Thus, the command 136 may be written in a format or include instructions that reference or otherwise take into account how the database 108 is organized. In response to receiving the command 136, the database 108 may send a result 138 of performing the command 136 to the first set of applications 114. For example, when the command 136 performs an action such as reading the data 112 from the portion 110 of the database 108, the result 138 may include the data 112. As another example, when the command 136 performs an action such as writing the data 112 to the portion 110 of the database 108, the result 138 may indicate whether or not the write was successfully performed. In some cases, the result 138 may include an error message identifying an error that occurred when attempting to execute the command 136.

The second set of applications 120 may use the gateway module 126 to access the database 108. For example, the second set of applications 120 may send a command 140 to the gateway module 126. The command 140 may include an action 142 to be performed to the database 108. Unlike the command 136 that is sent by the first set of applications 114, the command 140 may be written in a format such that the command 140 does not know how the database 108 is organized, does not know the characteristics 134 of the portion 110, does not know the characteristics 134 of the data 112, or other information associated with the database 108. For example, when the database 108 includes a merchant inventory database, the command 136 may determine a price of an item by specifying "use this item identifier to identify a row in an inventory table and read the third column to determine a price of the item." The command 140 may determine the price of the item by specifying "determine a price of an item associated with this item identifier." The gateway module 126 may determine how to perform the command 140 using the configuration data 130 and translate the command 140 to create a translated command 144. For example, the configuration data 130 may provide information indicating that a first table may be used to retrieve a stock keeping unit (SKU) using a name of an item and a second table may be used to retrieve a price of an item using the SKU. In some cases, the translated command 144 may include one or more commands or actions (e.g., a set of commands) that are to be performed to the database 108. The format of the translated command 144 may be similar to the format of the command 136 because the translated command 144 may be written in a way that takes into account how the database 108 is organized.

The following examples illustrate the difference between the command 140 and the translated command 144. For example, the command 140 may read a name of an author of a particular book and may be implemented as:

GET: {"fields": [authorName]}
"BookID": 7}.

The translated command 144 for a relational database may be implemented as:

SELECT author.name FROM Contributor author
LEFT JOIN Book book ON book.id=author.BookID
AND author.Type='Author' WHERE book.ID=7.

As another example, the translated command 144 may include instructions that verify whether a field or a row in a table exists before attempting to write to the field or the row. To illustrate, when the command 140 is writing to a field, the translated command 144 may determine whether a particular row that includes the field exists in a table and, if the particular row does not exist, the translated command 144 may include instructions to create a new row before writing to a field in the row. For example, the command 140 may be implemented as:

PUT: {"authorName": "Smith, John"
"bookID": 7}.

The translated command 144 for a relational database may first check whether the row exists:

SELECT author.ID FROM Contributor author
LEFT JOIN Book book ON book.id=author.bookID AND
author.type="Author" WHERE bookID=7;

If the Contributor row does not exist, the SELECT action above may return NULL. If the row does not exist, then the translated command 144 may include instructions to add the row to the table:

INSERT INTO Contributor (bookID, Type) VALUES (7, "Author")

After the row is inserted, the translated command 144 may include instructions to update the newly inserted row with the name of the author:

UPDATE author SET Name="Smith, John" From Book book
LEFT JOIN Contributor author ON book.id=author.bookID
AND author.Type="Author" WHERE book.id=7.

The gateway module 126 may verify whether the command 140, the translated command 144, or both are valid, e.g., whether the command 140, the translated command 144, or both may be performed to the database 108. The gateway module 126 may use the configuration data 130 to perform different types of validation, such as field-level validation and cross-field validation. For example, field-level validation may validate a field in isolation, such as determining whether the field is a valid type of field, whether a size of the data being written to the field matches a size of the field, whether an application is attempting to write to a read-only field, whether a NULL value can be written to a field, whether uppercase and lowercase characters are being written to a field that is all caps, determining whether a value being written to a field falls within a predetermined range of values (e.g., more than a minimum value and less than a maximum value), etc. To illustrate, the gateway module 126 may determine that the command 140, the translated command 144, or both are attempting to write characters to a numeric only field based on the characteristics 134 associated with the portion 110. To illustrate, the portion 110 may be a numerical field, such as the selling price of an item, and the command 140 may be attempting to write a string that includes non-numeric characters. In this situation, the gateway module 126 may determine that the command 140 is inappropriate for the characteristics 134 associated with the portion 110 of the database 108 that is being accessed and send an error message ("msg" in FIG. 1) 148 to the application that sent the command 140. As another example, cross-field validation may validate whether data being accessed in a particular portion is valid in the context of other portions of the database. For example, the gateway module 126 may determine, based on the configuration data 130, that a prefix of "Mr." for a name of an individual with a gender of "female" is not valid while the prefix "Miss" or "Mrs." is valid.

If the gateway module 126 determines that the translated command 144 is valid based on the characteristics 134 associated with the portion 110 of the database 110, the gateway module 126 may translate the command 140 to create the translated command 144 and send the translated command 144 to the database 108. In response to receiving the translated command 144, the database 108 may send the result 138 to the gateway module 126 and the gateway module 126 may send the result 138 to the application (e.g., from the second set of applications 120) that sent the command 140. In some cases, based on the result 138, the translated command 144, or both, the gateway module 126 may determine whether one or more of the triggers 132 are to be applied. In response to determining that one or more of the triggers 130 is to be applied, the gateway module 126 may automatically (e.g., without human interaction) send a triggered command 146 to the database 108. In some cases, the triggered command 146 may include one or more commands (e.g., a set of commands) to be performed to the database 108. For example, in a payroll application, when a name of a new employee is added to one particular table, the triggered command 146 may add the name of the new employee to one or more additional tables. In some cases, the triggered command 146 may, based on the actions performed by the triggered command 146 to the database 108, trigger additional commands. If the gateway module 126 determines that one or more of the triggers 132 are to be applied based on the command 140 or the translated command 144, the triggered command 146 may be sent substantially simultaneously with the translated command 144. For example, the triggered command 146 may be included in the translated command 144, or the translated command 144 and the triggered command 146 may be packaged into a single message and sent to the database 108.

The gateway module 126 may determine whether one or more of the triggers 132 are to be applied 132 based on the translated command 144. In some cases, the translated command 144 and the triggered command 146 may be sent together, as a set of commands, to the database 108, while in other cases the translated command 144 and the triggered command 146 may be sent separately.

While the first set of applications 114, the second set of applications 120, the gateway module 126, and the database 108 are shown in FIG. 1 as being stored in the computer readable media 106 of the server 102, in some implementations at least some of the first set of applications 114, the second set of applications 120, the gateway module 126, or the database 108 may be stored on a different server (e.g., different from the server 102). For example, the first set of applications 114 may be stored on a first server, the second set of applications 120 may be stored on a second server, the gateway module 126 may be stored on a third server, and the database 108 may be stored on a fourth server. As another example, the first set of applications 114 and the second set of applications 120 may be stored on a first server and gateway module 126 and the database 108 may be stored on a second server. Of course, in other implementations, other configurations of the first set of applications 114, the second set of applications 120, the gateway module 126, and the database 108 are possible. Furthermore, in some implementations, the database 108 may be deployed across multiple servers and/or the database 108 may include multiple databases. The configuration data 130 may include information as to how the database 108 is configured, such as the types of data stored in each of the multiple databases, which server(s) host each of the multiple databases, etc., such that the second set of applications 120 may access the database 108 without being aware of how the database 108 is configured. For example, the translated command 144 may perform actions to multiple databases (e.g., hosted by multiple servers).

Thus, the gateway module 126 may enable applications, such as the second set of applications 120, to be written such that the applications uses commands that do not reference how the database 108 is organized. The gateway module 126 may translate commands (e.g., the command 140) received from the set of applications 120 into translated commands (e.g., the translated command 144) by accessing the configuration data 130 that includes information describing how the database 108 is organized and/or how data in the database 108 may be accessed. The configuration data 130 may provide various advantages. For example, when a new portion (e.g., field, row, column, table, and the like) of the database 108 is added to the database 108, updating the configuration data 130 with information on accessing the new portion may enable the second set of applications 120 to access the new portion without modifying the gateway module 126 or the second set of applications 120. As another example, the configuration data 130 may include details on transforming data stored in a particular portion of the database 108. To illustrate, if a format associated with a portion of the database 108 is changed from a previous (e.g., first) format to a current (e.g., second) format, updating the configuration data 130 with information on transforming the data from the current format to the pervious format may enable the second set of applications 120 to access the data without modifying the gateway module 126 or the second set of applications 120. As yet another example, the configuration data 130 may include business rules that specify the characteristics 134 of various portions of the database 108. The business rules may be updated without modifying the gateway module 126 or the second set of applications 120. For example, the business rules may specify that certain types of inventory items have a price between a minimum price and a maximum price.

Providing the gateway module 126 to enable applications to access one or more databases may provide various advantages. For example, applications may be written in a way that the applications are unaware of how data in each of the databases is organized, thereby simplifying writing applications. If the database changes from a first type of a database to a second type of database (e.g., from relational to non-relational), the applications can continue to access the second database without being rewritten, merely by updating the configuration data to include information about how the second database is organized (e.g., how the second database may be accessed). In addition, the gateway module may enable smaller portions (e.g., tables) of the database to be locked, enabling multiple portions of the database to be updated substantially contemporaneously (e.g., in parallel).

In some implementations, the gateway module 126 may be used when migrating from one type of database (e.g., a relational database) to another type of database (e.g., a NoSQL database or other non-relational database). For example, the first set of applications 114 may be older (e.g., legacy) applications that are written such that each of the N applications 116 to 118 references how the database 108 is organized. The second set of applications 120 may be newer applications that are written to access the database 108 using the gateway module 126 and without referencing how the database 108 is organized. When migrating from the database 108 (e.g., relational database) to a new type of database (e.g., NoSQL or other non-relational database), the gateway module 126 may be introduced and newer applications (e.g., the second set of applications 120) may be written to access the database 108 using the gateway module 126. During the migration, the first set of applications 114 may be rewritten over a period of time to access the database 108 using the gateway module 126, as described in more detail below.

The computer-readable media 106 may include memory, such as volatile memory, non-volatile memory, removable memory, and/or non-removable memory, implemented in any method or technology for storage of information, such as computer-readable instructions, data structures, program modules, or other data. Also, the processors 104 may include onboard memory in addition to or instead of the computer-readable media 106. Examples of storage media that may be included in the computer-readable media 106 and/or processors 104 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 102. Any such computer-readable storage media may be part of the server 102. The computer-readable media 106 may include software programs or other executable modules that may be executed by the processors 104. The computer-readable media 106 may be used to store device drivers, an operating system, software applications, and the like.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 104, as hardware, and/or as firmware. Typically, the functionality of the program modules may be combined or distributed as desired in various embodiments. An implementation of these modules and techniques may be stored on or transmitted across some form of computer-readable media.

Furthermore, while FIG. 1 sets forth an example of a suitable architecture that provides a gateway module 126 to access one or more databases, such as the database 108, numerous other possible architectures, frameworks, systems and environments will be apparent to those of skill in the art in view of the disclosure herein.

Figure 2:
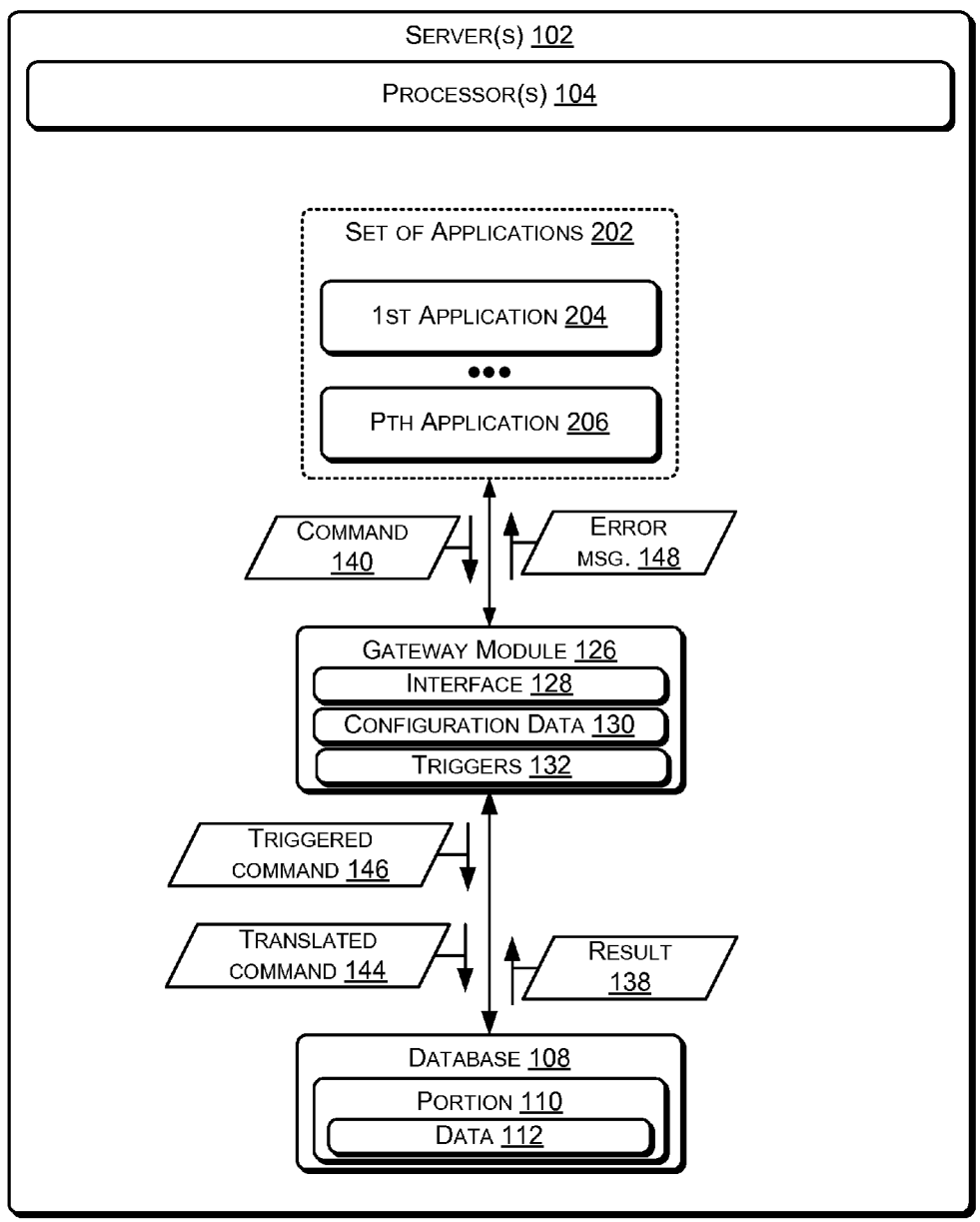
FIG. 2 is an illustrative architecture that includes a set of applications that use a gateway module to access a database according to some implementations.

FIG. 2 is an illustrative architecture 200 that includes a set of applications that access a database using a gateway module according to some implementations. The gateway module 126 may be used when migrating from the database 108 (e.g., a relational database) to a new type of database (e.g., a non-relational database such as NoSQL). For example, a set of applications 202 may access the database 108. The set of applications 202 may include P software applications, including a first application 204 and a Pth application 206. During the migration, older applications (e.g., the first set of applications 114 of FIG. 1) may be rewritten to access the database 108 using the gateway module 126. Thus, the set of applications 202 may include at least some of (i) the rewritten first set of applications 114 and (ii) the second set of applications 120 of FIG. 1.

The set of applications 202 may access the database 108 using the gateway module 126. For example, the set of applications 202 may send the command 140 to the gateway module 126. The command 140 may be written in a format that does not reference (i) how the database 108 is organized, (ii) characteristics of the portion 110 (e.g., a size or other characteristic of a field, a row, a table, or another portion of a database), characteristics of the data 112 (e.g., whether the data 112 is a numeric field, an alphanumeric field, or the like), etc. The gateway module 126 may use the configuration data 130 that describes how the database 108 is organized to create the translated command 144 based on the command 140. For example, the command 140 may provide a parameter X (e.g., a name of an item in inventory) and request data Y (e.g., a price of an item) that is associated with parameter X. The configuration data 130 may include details on how to retrieve Y based on X. The gateway module 126 may use the configuration data 130 to create the translated command 144. The translated command 144 may include instructions to look up A using X in a first table, look up B using A in a second table, and look up Y using B in a third table.

Before sending the translated command 144 to the database 108, the gateway module 126 may determine whether the translated command 144 is valid based on characteristics of the portion 110, the data 112, or both. For example, the gateway module 126 may determine whether the translated command 144 is attempting to write an alphanumeric string of length M to a field with a length of N, where M>N. As another example, the gateway module 126 may determine whether the translated command 144 is attempting to write an alphanumeric string to a numeric only (e.g., price or date) field. If the gateway module 126 determines that the translated command 144 is not valid, the gateway module 126 may send the error message 148 to the set of applications 202.

If the gateway module 126 determines that the translated command 144 is valid, the gateway module 126 may send the translated command 144 to the database 108. In response, the gateway module 126 may receive the result 138 of performing the translated command 144. The gateway module 126 may send the result 138 to a software application of the P applications 204 to 206 that sent the command 140.

Based on the translated command 144, the result 138, or both, the gateway module 126 may determine whether the conditions are such that one of the triggers 132 is to be applied. If the gateway module 126 determines that one of the triggers 132 is to be applied, the gateway module 126 may send the triggered command 144 to the database 108. In some cases, the translated command 144, the triggered command 146, or both may include one or more commands to be performed to the database 108.

Thus, the gateway module 126 may be used when migrating from the database 108 to another database. For example, in FIG. 1, older applications, such as the first set of applications 114, may directly access (e.g., read from or write to) the database 108 while newer applications, such as the second set of applications 120, may access the database 108 using the gateway module 126. The first set of applications 114 may be rewritten over a period of time to access the database 108 using the gateway module 126. After the set of applications 114 have been rewritten to access the database 108 using the gateway module 126, the set of applications 202 may include the first set of applications 114 and the second set of applications 120. When migrating from the database 108, a new database may be added to the architecture 200 and the new database may be synchronized with the database 108, such that any writes (e.g., additions or modifications) made to the database 108 may be made to the new database, as described below.

Figure 3:
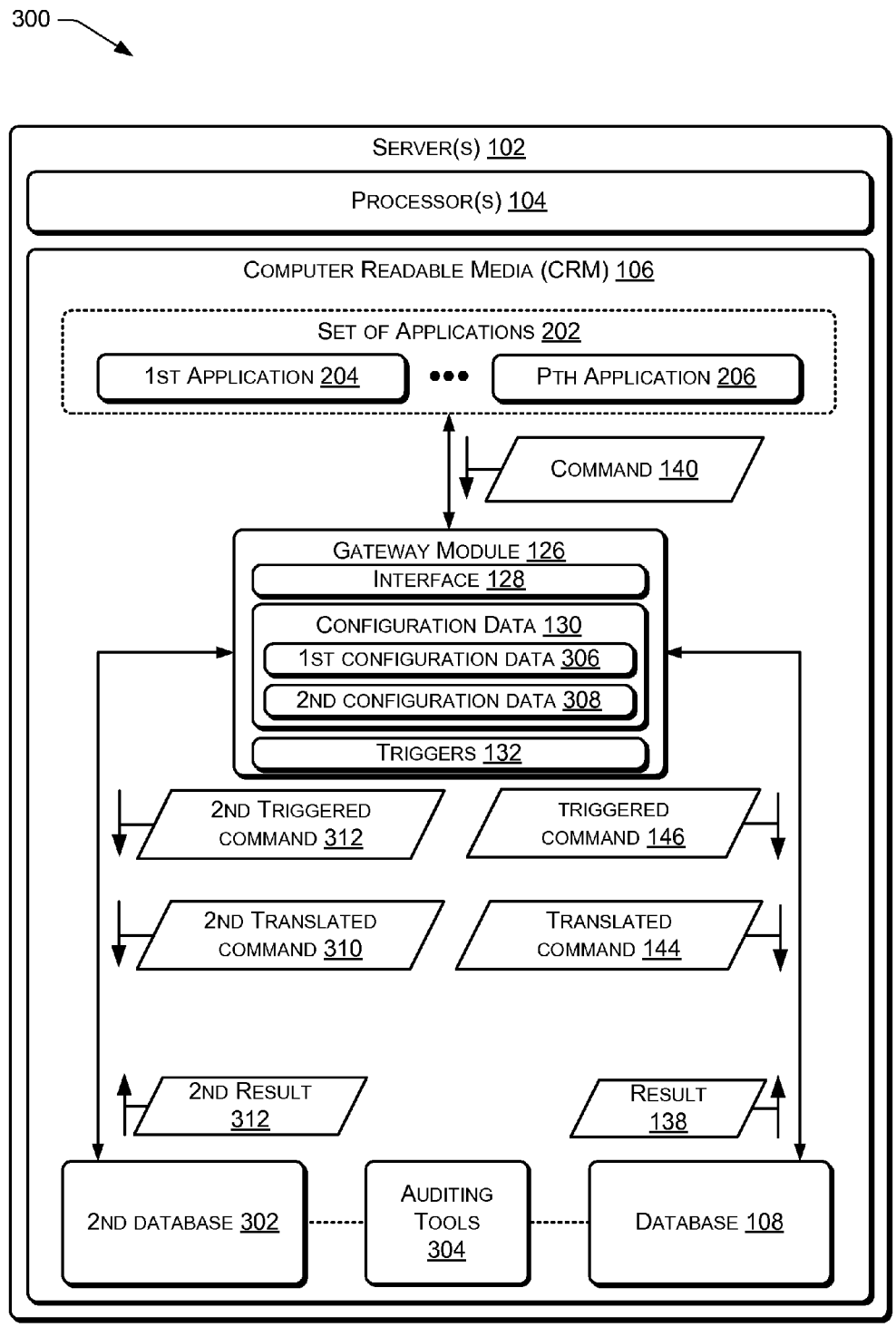
FIG. 3 is an illustrative architecture that includes a set of applications that use a gateway module to access two databases that are synchronized with each other according to some implementations.

FIG. 3 is an illustrative architecture 300 that includes a set of applications that use a gateway module to access two databases that are synchronized with each other according to some implementations. The architecture 300 illustrates how a second database 302 may be added to the architecture 200. In some implementations, the database 108 may be a first type of database (e.g., a relational database) while the second database 302 may be a second type of database (e.g., a non-relational database) that is different from the first type of database.

In the architecture 300, auditing tools 304 may be used to audit the database 108 and the second database 302. The auditing tools 304 may determine whether the database 108 and the database 302 are synchronized with each other. For example, the auditing tools 304 may determine whether a write command that was successfully performed on the database 108 was also successful performed on the second database 302. As another example, the auditing tools 304 may determine whether a write command that was successfully performed on the second database 302 was also successful performed on the database 108.

The configuration data 130 may include first configuration data 306 associated with the database 108 and second configuration data 308 associated with the second database 302. The configuration data 130 may include information as to how the databases 108 and 302 are organized, how to access different portions (e.g., fields, rows, columns, tables, and the like) of the databases 108 and 302, and other information related to the databases 108 and 302. For example, the set of applications 202 may send the command 140 to the gateway module 126. The gateway module 126 may use the first configuration data 306 associated with the database 108 to create the translated command 144 and send the translated command 144 to the database 108. The gateway module 126 may use the second configuration data 308 associated with the second database to create a second translated command 310 and send the second translated command 310 to the second database 310.

If the gateway module 126 determines that the command 140 includes an action to write to a portion of the database 108 or the second database 302, the gateway module 126 may create both the translated command 144 and the second translated command 310. The gateway module 126 may send the translated command 144 and the second translated command 310 substantially contemporaneously (e.g., in parallel) to the database 108 and the second database 302, respectively. Sending the translated commands 144 and 310 substantially at the same time may enable the write to be performed to both the database 108 and the second database 302, thereby keeping the database 108 and the second database 302 are synchronized with each other.

If the gateway module 126 determines that the command 140 includes an action to read from a portion of the database 108 or the second database 302, the gateway module 126 may determine whether to read from the database 108 or the second database 302. For example, in some implementations, one of the databases 108 or 302 may be designated as a 'master' and actions to read data may be performed on the database that is designated as the master. The gateway module 126 may create both the translated command 144 and the second translated command 310. If the database 108 is designated as the master, the gateway module 126 may send the translated command 144 to the database 108. If the second database 302 is designated as the master, the gateway module 126 may send the second translated command 310 to the second database 302.

The gateway module 126 may determine whether conditions are met such that one or more of the triggers 132 apply. For example, the gateway module 126 may determine, based on one or more of the command 140, the translated command 144, the second translated command 310, the result 138 of performing the translated command 144, or a result 312 of performing the second translated command 310, whether one or more of the triggers 132 apply. In response to determining that one or more of the triggers 132 may apply, the gateway module 126 may automatically send the triggered command 146 to the database 108, a second triggered command 312 to the second database 302, or both. In some cases, one or more of the triggered command 146, the translated command 144, the second translated command 310, or the second triggered command 312 may each include one or more commands.

The auditing tools 304 may periodically (e.g., at regular time intervals) or when a specific event (e.g., a write) occurs, determine whether the database 108 and the second database 302 are synchronized with each other. When the auditing tools 304 determine that the database 108 and the second database 302 are not synchronized, the auditing tools 304 may take one or more corrective actions to synchronize the database 108 and the second database 302. For example, if a write command was successfully performed to the database 108 but not successfully performed to the second database 302, the auditing tools 304 may perform the write command to the second database 302 to synchronize the second database 302 with the database 108. As another example, if a write command was successfully performed to the second database 302 but not successfully performed to the database 108, the auditing tools 304 may perform the write command to the database 108 to synchronize the database 108 with the second database 302. Of course, the auditing tools 304 may take other types of corrective actions to synchronize the database 108 and the second database 302.

Thus, the gateway module 126 may enable different types of databases, such as a relational database and a non-relational (e.g., NoSQL) database to be accessed. When migrating from the database 108 to the second database 302, both the database 108 to the second database 302 may co-exist for a period of time. The gateway module 126 may receive commands, such as the command 140, from the set of applications 202 and translate the commands for both the databases 108 and 302 using the configuration data 130. The auditing tools 304 may be used to perform audits to determine whether the databases 108 and 302 are synchronized with each other. If the auditing tools 134 determine that the databases 108 and 302 are not synchronized with each other, the auditing tools 134 may perform one or more corrective actions to resynchronize the databases 108 and 302 with each other.

When migrating from the database 108 to the second database 302, the databases 108 and 302 may coexist for a period of time. After a determination is made that the second database 302 is functioning properly, the database 108 may be removed from the architecture 300 and commands received by the gateway module 126 may be performed to the second database 302, as described in more detail below.

Figure 4:
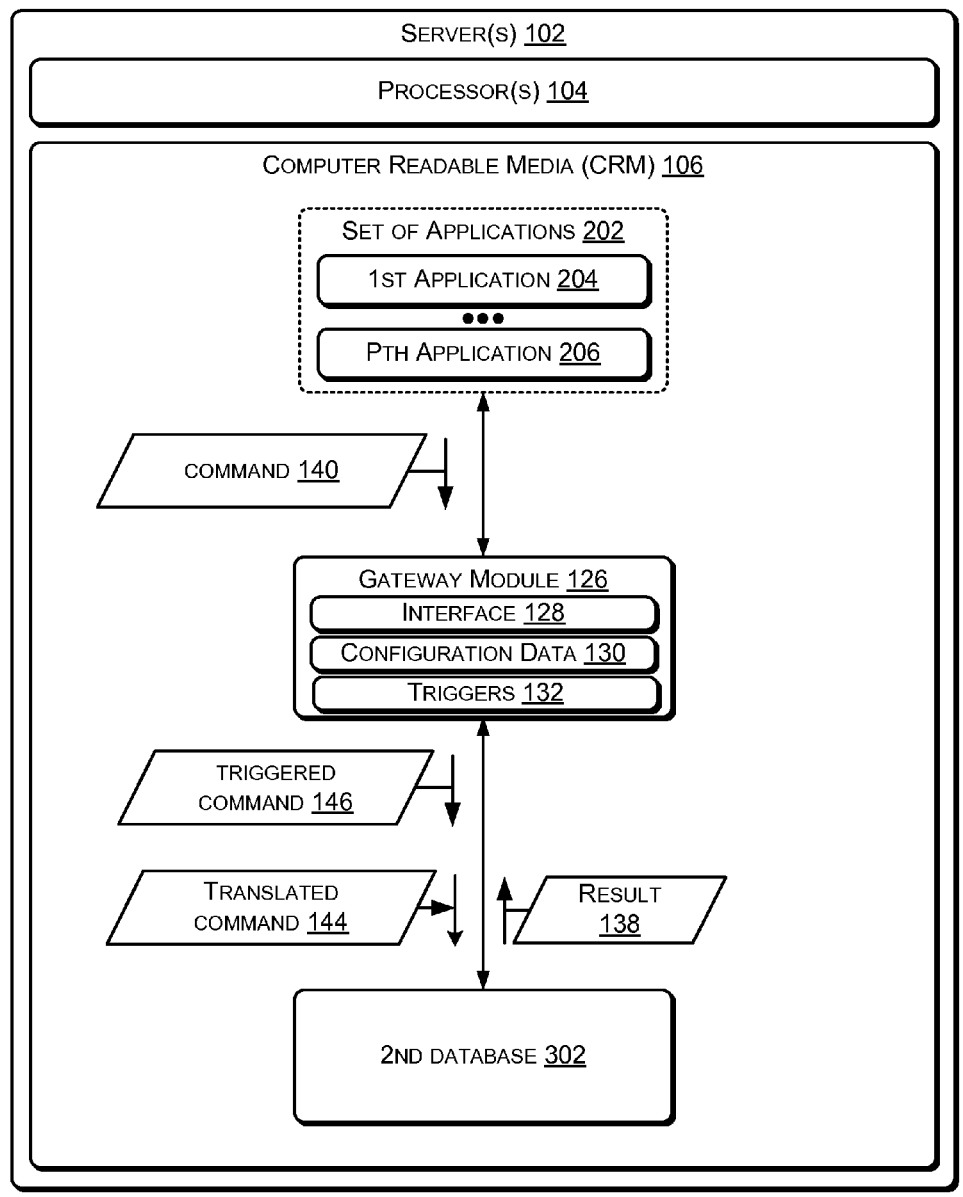
FIG. 4 is an illustrative architecture that includes a set of applications that use a gateway module after migration to a second database according to some implementations.

FIG. 4 is an illustrative architecture 400 that includes a set of applications that use a gateway module after migration to a second database according to some implementations. The architecture 400 illustrates the architecture 300 with the removal of the first database 108, e.g., the system has completed migrating to the second database 302.

The gateway module 126 may receive the command 140 from a software application from the set of applications 202. The gateway module 126 may create the translated command 144 based on the configuration data 130 associated with the second database 302. The gateway module 126 may send the translated command 144 to the second database 302. The second database 302 may receive the translated command 144 and return the result 132 of performing the translated command 144 to the gateway module 126. The gateway module 126 may receive the result 132 and send the result 132 to the software application from the set of applications 202 that sent the command 140.

In some cases, the gateway module 126 may determine whether conditions associated with one or more of the triggers 132 have been satisfied (e.g., met) based on one or more of the command 140, the translated command 144, or the result 132. If the gateway module 126 determines that the conditions associated with one or more of the triggers 132 are satisfied, the gateway module 126 may automatically send the triggered command 146 to the second database 302.

Thus, by introducing the gateway module 126, applications may be written to send commands to the gateway module 126. The commands may be written in a format that does not take into account how data is organized in the database. The gateway module 126 may access configuration data that includes information on how one or more databases are organized. The gateway module 126 may translate commands received from the applications based on the configuration data and send the translated commands to the one or more databases. The gateway module 126 may determine whether conditions associated with triggers have been satisfied. If the conditions have been satisfied, the gateway module 126 may send one or more triggered commands to the one or more databases.

Database Migration Using the Gateway Module

FIGS. 1-4 illustrate how a system may be migrated from an older database (e.g., the database 108) to a newer database (e.g., the second database 302). For example, in FIG. 1, older applications, such as the first set of applications 114, may directly access the database 108 while newer applications, such as the second set of applications 120, may be written to access the database 108 using the gateway module 126. Initially, both the first set of applications 114 and the second set of applications 120 may perform both reads and writes to the database 108.

As part of the migration, software applications from the first set of applications 114 that write directly to the database 108 may be rewritten to use the gateway module 126 such that, after a period of time, the first set of applications 114 may include only applications that read from the database 108 while the second set of applications 120 includes applications that read from or write to the database 108. Continuing with the migration, the remaining applications from the first set of applications 114 may be rewritten to read data from and write data to the database 108 using the gateway module 126, resulting in the architecture illustrated in FIG. 2.

Another database, such as the second database 302, may be introduced as the target database for the migration, resulting in the architecture illustrated in FIG. 3. At this stage in the migration, the gateway module 126 may write to both databases, with the audit tools 304 confirming whether the writes were successful and taking corrective actions if necessary to keep both databases synchronized. The database 108 may initially be designated as the master, such that reads are performed on the database 108 and write actions are considered successful when the write actions are successfully performed to the database 108. After a determination is made that the second database 302 is stable, the second database 302 may be designated as the master, such that reads are performed on the second database 302 and write actions are considered successful when the write actions are successfully performed to the second database 302.

In the final stage of the migration from the database 108 to the second database 302, the database 108 may be decommissioned and removed, resulting in the architecture illustrated in FIG. 4. Of course, other migration strategies are possible based on the various architectures illustrated herein. In addition, in some implementations, the gateway module 126 may be used in a heterogeneous database environment in which there are multiple databases and at least two of the databases are different types of databases, as described in more detail below.

Figure 5:
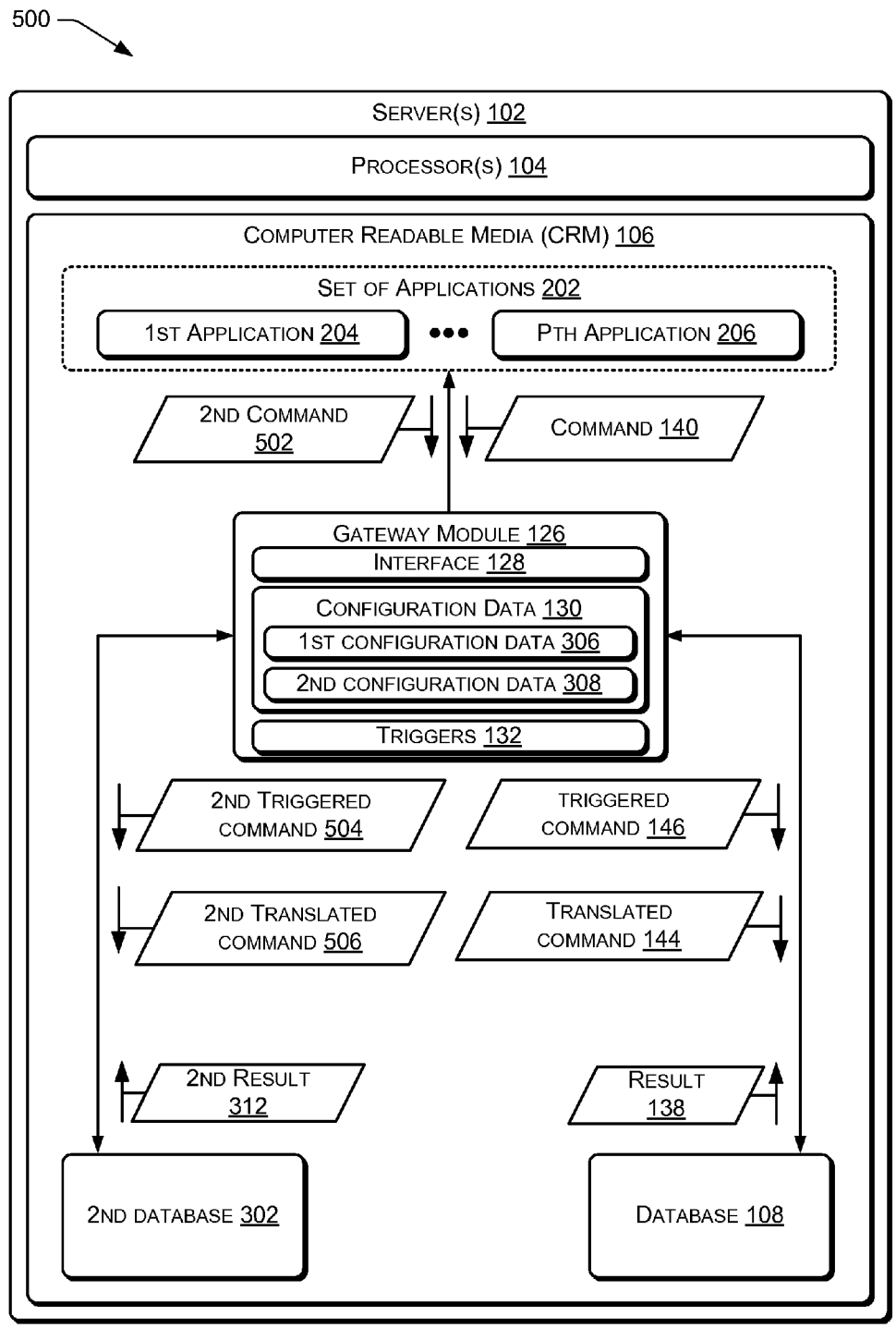
FIG. 5 is an illustrative architecture that includes a set of applications that use a gateway module to access two different types of databases according to some implementations.

FIG. 5 is an illustrative architecture 500 that includes a set of applications that use a gateway module to access two different types of databases according to some implementations. The architecture 500 illustrates how the gateway module 126 may be used to support a system that includes more than one type (e.g., relational, non-relational, NoSQL, etc.) of database. For example, when a first company purchases/merges with a second company, the first company may have a specific type of database that is different from the type of database that the second company uses. To illustrate the first company may have a relational type of database while the second company may have a non-relational type of database. In this situation, the gateway module 126 may be used to access two (or more) types of databases, such as the relational database and the non-relational database. While the architecture 500 includes two databases, the gateway module 126 may be used in other implementations (e.g., heterogeneous database environments) where the gateway module 126 enables access to multiple (e.g., two or more) databases, where at least two of the multiple databases are of different types.

In some implementations, the gateway module 126 may receive the command 140 that includes one or more actions to be performed to the database 108. The gateway module 126 may access the first configuration data 306 associated with the database 108 to create the translated command 144. The gateway module 126 may send the translated command 144 to the database 108. The gateway module 126 may determine whether one or more of the conditions associated with the triggers 132 are satisfied based on one or more of the command 140, the translated command 144, or the result 138 of performing the translated command 144 to the database 108. In response to determining that one or more of the conditions associated with the triggers 132 been satisfied, the gateway module 126 may send the triggered command 146 to the database 108 and/or the second database 302. For example, the translated command 144 may access a portion of the database 108 while the triggered command 146 may access a portion of the second database 302. If the database 108 includes multiple databases, the translated command 144 and/or the triggered command 146 may be sent to a subset of the databases from the multiple databases based on the configuration data 130. For example, the gateway module 126 may use the configuration data 130 to determine which of the subset of the multiple databases to send the translated command 144 and/or the triggered command 146.

The gateway module 126 may receive a second command 502 that includes one or more actions to be performed to the second database 302. The gateway module 126 may access the second configuration data 308 associated with the second database 302 to create the second translated command 506. The gateway module 126 may send the second translated command 506 to the second database 302. The gateway module 126 may determine whether one or more of the conditions associated with the triggers 132 are satisfied based on one or more of the second command 502, the second translated command 506, or a second result 312 of performing the second translated command 506 to the second database 302. In response to determining that one or more of the conditions associated with the triggers 132 have been satisfied, the gateway module 126 may send the second triggered command 504 to the second database 302 and/or the database 108. For example, the second translated command 506 may access a portion of the second database 302 while the second triggered command 504 may access a portion of the database 108. If the database 302 includes multiple databases, the second translated command 506 and/or the second triggered command 504 may be sent to a subset of the databases from the multiple databases based on the configuration data 130. While two databases 108 and 302 are illustrated in FIG. 5, the techniques described herein may also be used for architectures with more than two databases.

Thus, the gateway module 126 may enable the set of applications 202 to access two or more types of databases without the set of applications 202 or the commands sent by the set of applications 202 taking into account how each of the types of databases are organized. For example, the database 108 may be a relational database while the second database 302 may be a non-relational database. However, the command 140 and the second command 502 may be similar to one another in terms of command format. Thus, commands sent by the set of applications 202 may be consistent and may not consider the type of database that is being accessed or consider how the database is organized.

The gateway module 126 may determine which database is being accessed and determine how to access that database based on the configuration data 130. Thus, the configuration data 130 may include information on how different types of databases are organized and may be accessed (e.g., read from or written to). For example, the gateway module 126 may determine that the database 108 is a relational database and create the translated command 144 that includes commands to access the relational database. As another example, the gateway module 126 may determine that the database 108 is a non-relational (e.g., NoSQL) database and construct a second translated command 506 that includes commands to access the non-relational database.

Figure 6:
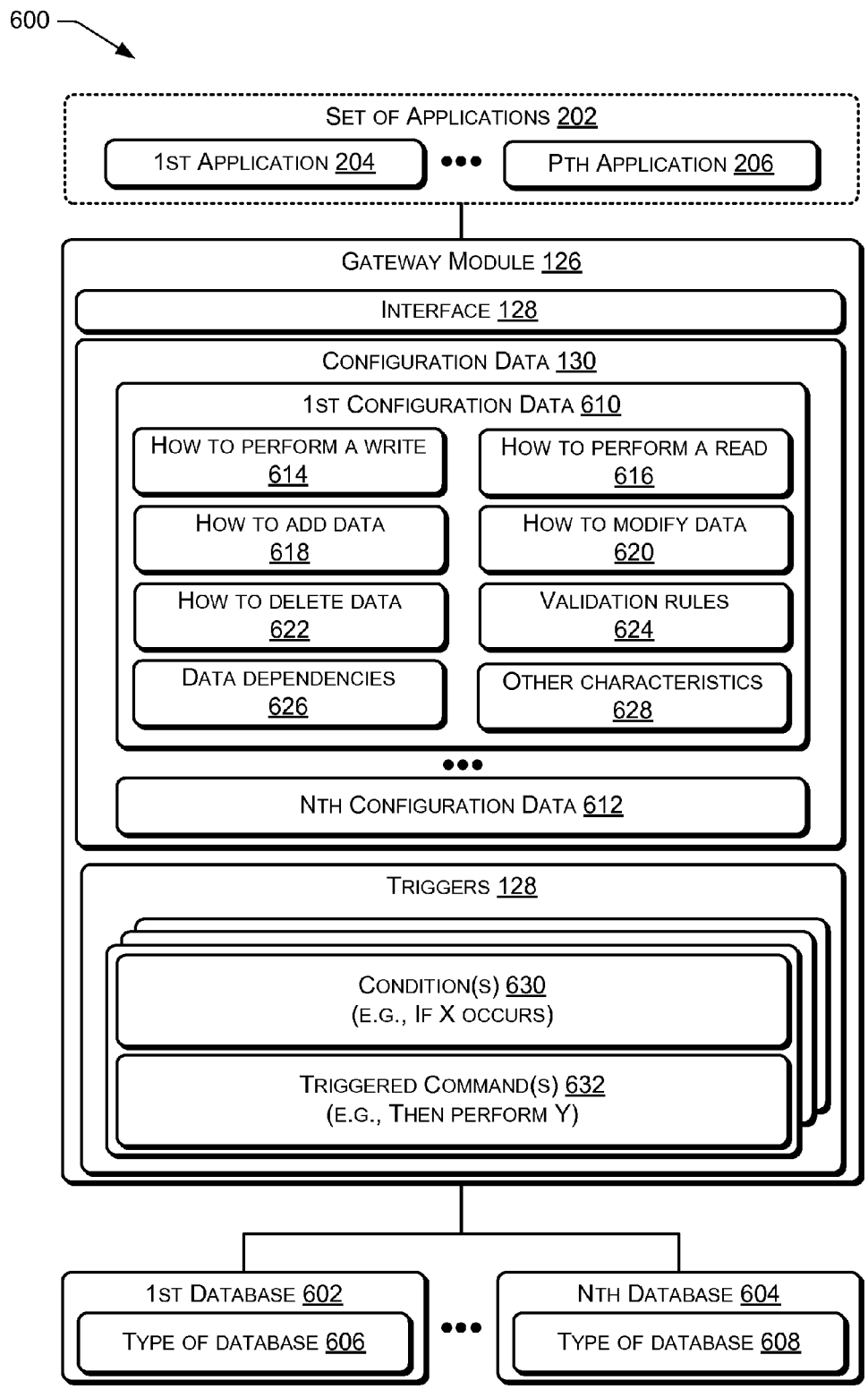
FIG. 6 is an illustrative architecture that includes configuration data associated with one or more databases according to some implementations.

FIG. 6 is an illustrative architecture 600 that includes configuration data associated with one or more databases according to some implementations. The set of applications 202 may include P (where P>1) software applications, including a first application 204 to a Pth application 206. The set of applications 202 may use the gateway module 126 to access one or more databases, such as a first database 602 to an Nth database 604. Each of the N databases 602 to 604 may be of a particular type, e.g., the type of the database may identify how data in the database is organized. For example, the first database 602 may be a type of database 606 and the Nth database 604 may be a type of database 608. The type of database 606 or 608 may include relational, non-relational, structured query language (SQL) compatible, NoSQL, object database, object relational database, another type of database, or any combination thereof. In some implementations, the N databases 602 to 604 may be of the same type of database while in other implementations, at least two of the databases may be different types of databases.

To enable access to the N databases 602 to 604, the configuration data 130 may be stored in a type of computer-readable media (e.g., memory) that can be quickly accessed by the gateway module 126, such as a cache memory or a main memory. The configuration data 130 may include configuration data associated with each of the N databases 602 to 604. For example, the configuration data 130 may include N configuration data corresponding to the N databases 602 to 604, such as first configuration data 610 associated with the first database 602 through to Nth configuration data 612 associated with the Nth database 604. Each of the N configuration data 610 to 612 may describe how each of the corresponding N databases 602 to 604 is organized. For example, the first configuration data 610 may include information associated with the first database 602, such as one or more of how to perform a write 614, how to perform a read 616, how to add data 618, how to modify data 620, how to delete data 622, validation rules 624, data dependencies 626, or other characteristics 628. How to perform a write 614 may describe how to write data to a particular portion (e.g., a field, a row, a table, and the like) of the first database 602. How to perform a read 616 may describe how to read data from a particular portion of the first database 602. How to add data 618 may describe how to add data to a particular portion of the first database 602. How to modify data 620 may describe how to modify data stored in a particular portion of the first database 602. How to delete data 622 may describe how to delete data from a particular portion of the first database 602.

The validation rules 624 may describe how to determine whether a particular command or action is valid for a particular portion of the first database 602. For example, the validation rules 624 may describe a particular portion of the first database 602, such as whether the data in the particular portion is numeric data or alphanumeric data, a size of the data, and other data characteristics to enable the gateway module 126 to determine whether a command is attempting an invalid action, such as writing non-numeric data to a numeric only field, writing data that exceeds a size of the field, and the like. The validation rules 624 may perform other types of checks to determine a validity of one or more commands that are to be performed to one or more databases, such as a length validation (e.g., verify that data being written to a portion of a database has a size that meets a minimum and/or maximum size associated with the portion), whether the commands are attempting to write to a read-only field, whether a value to be written to a portion of a database is included in a set of allowable values associated with the portion (e.g., verify whether a numeric value is being written to a numeric-only field etc.), and the like.

The data dependencies 626 may describe relationships (e.g., dependencies) between different portions of the first database 602. For example, in an inventory database, the data dependencies 626 may describe how a first table is related to a second and a third table, etc. The other characteristics 628 may describe other characteristics associated with the first database 602. At least some of the first configuration data 610 may enable the gateway module 126 to translate a command sent by the set of applications 202 to create a translated command that can be executed on the first database 602. Each of the N configuration data 610 to 612 may include data similar to the first configuration data 610.

The triggers 128 may include multiple pairs of one or more conditions 630 and one or more triggered commands 632. Thus, each of the triggers 128 may be of the form "if condition X occurs then automatically perform command Y." For example, the conditions 630 may specify that if a write command is performed to a particular portion (e.g., field) of the first database 602, then the triggered commands 632 are to be performed to other portions of the first database 602. For example, in a payroll database, adding a new employee name to a particular table may trigger one or more commands to automatically add the new employee name to additional tables (e.g., other tables that include employee names). As another example, when a write is performed to a particular portion of a database, a triggered command may automatically write a timestamp (e.g., a current date and time) to a field that identifies when the particular portion was last modified. As yet another example, when a write is performed to a particular portion of a database, a triggered command may automatically write to a log file indicating that the particular portion was modified and an identity of the software application that performed the modification.

In some cases, the action performed by a triggered command may cause one or more additional actions to be triggered. For example, a software application may write to a first portion of a database, thereby satisfying a first condition that results in the gateway module 126 sending a first triggered command to the database. The first triggered command may write to a second portion of the database, thereby satisfying a second condition that results in the gateway module 126 sending a second triggered command to the database, and so on. Thus, a triggered command may trigger additional triggered commands from the triggered commands 632.

Thus, the configuration data 130 may describe how each of the N databases 602 to 604 that are supported by the gateway module 126 are organized and how each of the databases 602 to 604 may be accessed (e.g., written to, read from, etc.). The configuration data 130 may enable the gateway module 126 to translate a command sent by a software application from the set of applications 202 to create a translated command that may be performed on a particular database. The command sent by the set of applications 202 may be very simple because the command may not include any information associated with how the database is organized. In contrast, the translated command may be specific to a particular database and may be created based on the configuration data 130 associated with the particular data.

Example Processes

Figure 7:
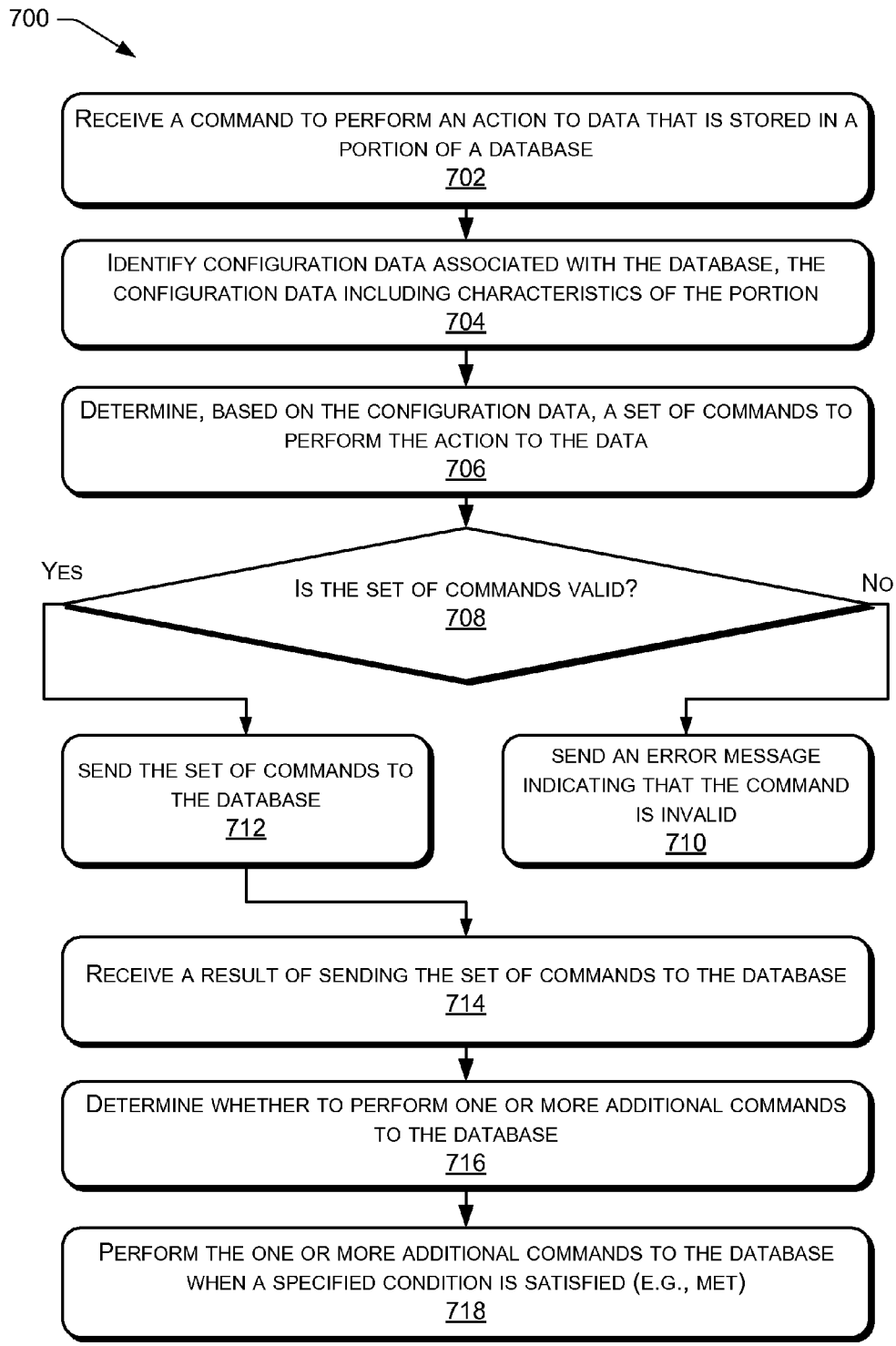
FIG. 7 is a flow diagram of an example process that includes determining a set of commands to perform an action to data in a database according to some implementations.
Figure 8:
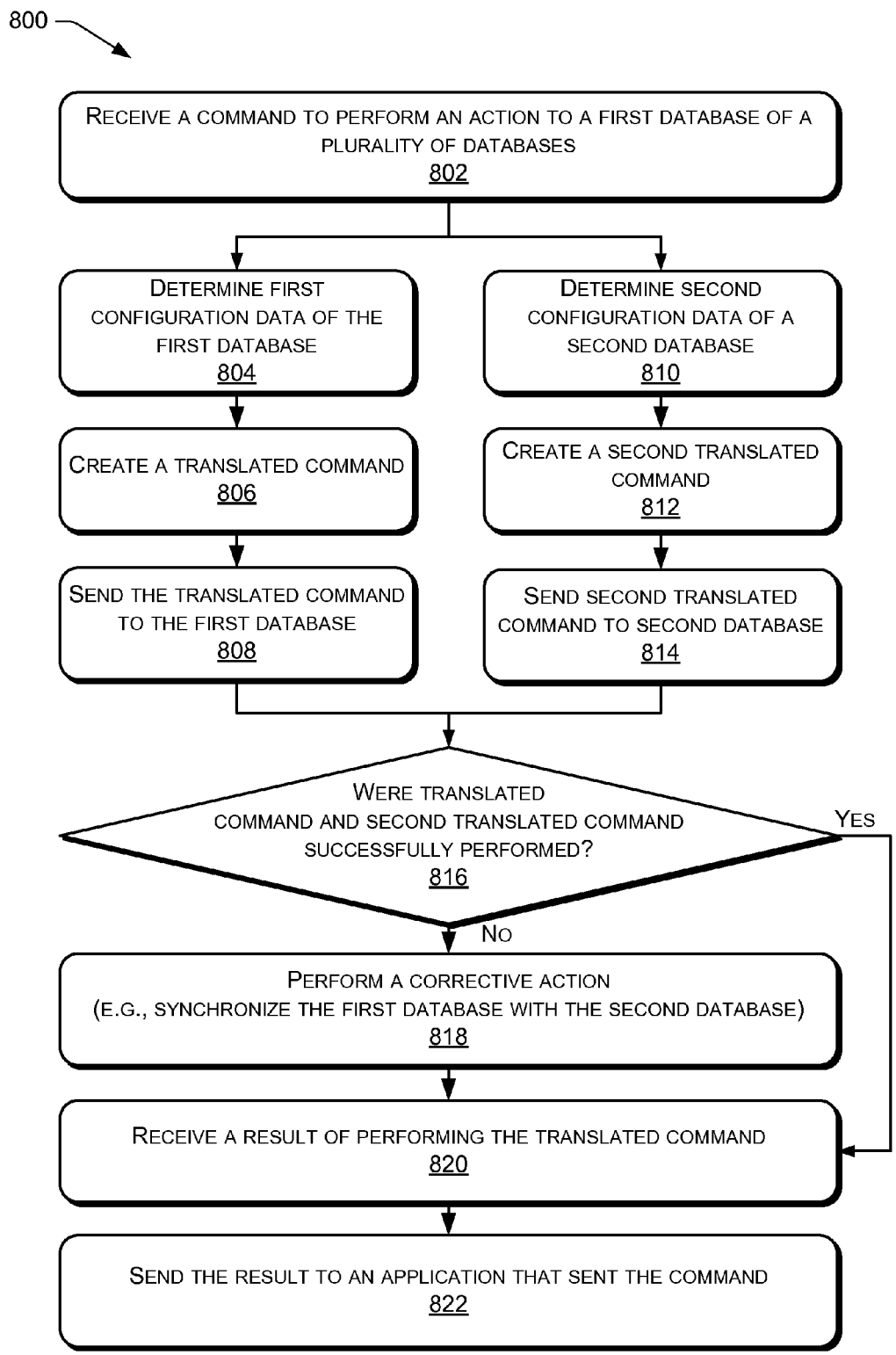
FIG. 8 is a flow diagram of an example process that includes creating a first translated command to access a first database and a second translated command to access a second database according to some implementations.
Figure 9:
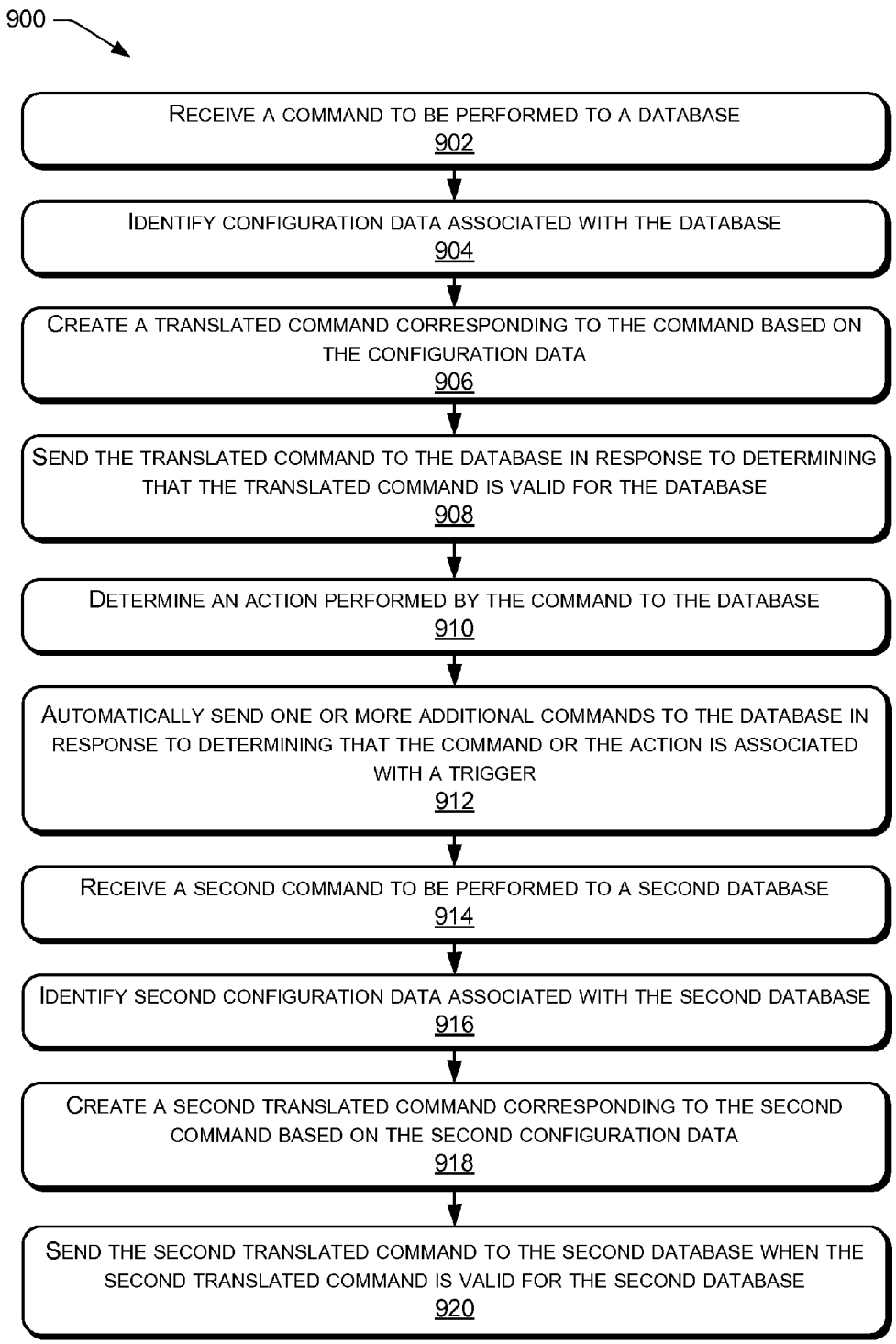
FIG. 9 is a flow diagram of an example process that includes creating a translated command based on configuration data associated with a database according to some implementations.

In the flow diagrams of FIGS. 7-9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800, and 900 are described with reference to the architectures 100, 200, 300, 400, and 500 as described above, although other models, frameworks, systems and environments may implement these processes.

FIG. 7 is a flow diagram of an example process 700 that includes determining a set of commands to perform an action to data in a database according to some implementations. The process 700 may be performed by a gateway, such as the gateway module 126 of FIG. 1.

At 702, a command to perform an action to data that is stored in a portion of a database may be received. For example, in FIG. 1, the gateway module 126 may receive the command 140 to perform the action 142 to the data 112 stored in the portion 110 of the database 108.

At 704, configuration data associated with the database may be identified. The configuration data may include characteristics associated with the portion of the database. For example, in FIG. 1, the gateway module 126 may determine the characteristics 134 associated with the portion 110 or the data 112 of the database 108.

At 706, a set of commands to perform the action to the data may be determined based on the configuration data. For example, in FIG. 1, the gateway module 126 may create the translated command 144 that includes a set of one or more commands based on the configuration data 130. The translated command 144 may perform the action 142 to the database 108.

At 708, a determination may be made whether the set of commands is valid. For example, in FIG. 1, the gateway module 126 may determine whether the translated command 144 is valid based on the characteristics 134 associated with the portion 110 or associated with the data 112. To illustrate, the gateway module 126 may determine whether the translated command 144 is attempting an invalid operation, such as attempting to write non-numeric characters to a numeric-only field, attempting to write M number of characters to a field that holds N number of characters, where M>N, and the like.

In response to determining that the set of commands is not valid, at 708, an error message indicating that the command is invalid may be sent, at 710. For example, in FIG. 1, in response to determining that the translated command 146 is invalid, the gateway module 126 may send the error message 148 to the application that sent the command 140.

In response to determining that the set of commands is valid, at 708, the set of commands may be sent to the database, at 712. For example, in FIG. 1, in response to determining that the translated command 144 is valid, the gateway module 126 may send the translated command 144 to the database 108.

At 714, a result of sending the set of commands to the database may be received. For example, in FIG. 1, the gateway module 126 may receive the result 138 of performing the translated command 144 to the database 108.

At 716, a determination may be made whether to perform one or more additional commands to the database. The determination to perform the one or more additional commands to the database may be based on the set of commands, the result, or both.

At 718, the one or more additional commands may be performed to the database when a specified condition is satisfied. For example, in FIG. 1, the gateway module 126 may determine whether conditions associated with one or more of the triggers 132 have been met. If the conditions associated with the triggers 132 are met, the gateway module 126 may send one or more additional commands, such as the triggered command 146, to the database 108.

Thus, a gateway module may access configuration data associated with a database and translate commands to perform actions to the database into translated command based on the configuration data. The commands received by the gateway module may not be specific to a particular database or a particular type of database. The translated command may perform the specified actions to a particular database and may reference how the particular type of database is organized.

FIG. 8 is a flow diagram of an example process 800 that includes creating a first translated command to access a first database and a second translated command to access a second database according to some implementations. For example, the process 800 may be performed by the gateway module 126 of FIG. 3.

At 802, a command to perform an action to a first database of a plurality of databases may be received. For example, in FIG. 3, the gateway module 126 may receive the command 140 that is to be performed to the database 108.

At 804, first configuration data associated with the first database may be determined. For example, in FIG. 3, the gateway module 126 may identify the first configuration data 306 associated with the database 108.

At 806, a translated command may be created. For example in FIG. 3, the gateway module 126 may create the translated command 144 corresponding to the command 140 based on the first configuration data 306.

At 808, the translated command may be sent to the first database. For example, in FIG. 3, the gateway module 126 may send the translated command 144 to the database 108.

At 810, second configuration data associated with the second database may be determined. For example, in FIG. 3, the gateway module 126 may identify the second configuration data 308 associated with the second database 302.

At 812, a second translated command may be created. For example, in FIG. 3, the gateway module 126 may create the second translated command 310 corresponding to the command 140 based on the second configuration data 308 associated with the second database 302.

At 814, the second translated command may be sent to the second database. For example, in FIG. 3, the gateway module 126 may send the second translated command 310 to the second database 302. In some implementations, 810, 812, and 814 may be performed substantially contemporaneously (e.g., in parallel) with 804, 806, and 808, respectively for certain types of commands (e.g., commands that perform a write action) but not for other types of commands (e.g., commands that perform a read action). If a command performs a read action, the gateway module may determine which database is designated as the master, access the configuration data associated with the master database, and translate the command based on the configuration data. For example, if the first database is designated as the master, the gateway module 126 may perform one or more of 804, 806, or 808. If the second database is designated as the master, the gateway module 126 may perform one or more of 810, 812, or 814.

At 816, a determination may be made whether the translated command and/or the second translated command were successfully performed. For example, the gateway module 126 may determine whether the translated command and/or the second translated command were successfully performed based on the result 138 and the second result 312, respectively.

In response to determining that the translated command or the second translated command was not successfully performed, at 816, a corrective action may be performed at 818. For example, in FIG. 3, in response to determining that the translated command 144 or the second translated command 310 was not successfully performed, the gateway module 126 may instruct the auditing tools 304 to perform a corrective action to synchronize the database 108 and the second database 302.

In response to determining that the translated command and the second translated command were successfully performed at 816, or after performing the corrective action, at 818, a result of performing the translated command may be received, at 820. For example, result may be received from the first database or the second database, depending on which database is designated as the master.

At 822, the result may be sent to an application that sent the command. For example, in FIG. 3, the gateway module 126 may receive the result 138 of performing the translated command 144 to the database 108 and send the result 138 to a software application in the set of applications 202 that sent the command 140. The gateway module 126 may receive the second result 312 of performing the second translated command 310 to the database 108 and send the result 312 to a software application in the set of applications 202 that sent the command 140.

Thus, the gateway module 126 may receive a command from a software application. If the command includes performing a write action, the gateway module 126 may, substantially contemporaneously, translate the command into (i) a first translated command (e.g., the translated command 144) to be performed on a first database and (ii) a second translated command (e.g., the second translated command 310) to be performed on a second database. The gateway module 126 may, substantially contemporaneously, send the first translated command to the first database and send the second translated command to the second database. For example, when migrating from the first database to the second database, the first translated command may be performed on the first database and the second translated from a command may be performed on the second database to keep both databases synchronized with each other during the migration.

If the command includes performing a read action, the gateway module 126 may identify which database to read from (e.g., by determining which database is designated as the master), determine configuration data associated with the identified database, translate the command into a translated command based on the configuration data, and send the translated command to the identified database.

FIG. 9 is a flow diagram of an example process 900 that includes creating a translated command based on configuration data associated with a database according to some implementations. The process 900 may be performed by the gateway module 126 of FIG. 5.

At 902, a command to be performed to database may be received. For example, in FIG. 5, gateway module 126 may receive the command 140 from a software application from the set of applications 202.

At 904, configuration data associated with the database may be identified. For example, in FIG. 5, the gateway module 126 may identify the first configuration data 306 associated with the database 108.

At 906, a translated command corresponding to the command may be created based on the configuration data. For example, in FIG. 5, the gateway module 126 may create the translated command 144 based on the first configuration data 306.

At 908, the translated command may be sent to the database in response to determining that the translated command is valid for the database. For example, in FIG. 5, the gateway module 126 may determine whether the translated command 144 is performing a valid action to a portion of the database 108.

At 910, an action performed by the command to the database may be determined.

At 912, one or more additional commands may be automatically sent to the database in response to determining that the command or the action is associated with the trigger. For example, in FIG. 5, the gateway module 126 may determine that the translated command 144 performed a write action to the database 108 based at least partly on the translated command 144, the result 138 or both. If the write action was performed to a particular portion of the database 108 such that the action satisfies one of the conditions associated with the triggers 132, the gateway module 126 may automatically send one or more additional commands, such as the triggered command 146, to the database 108. As another example, the gateway module 126 may determine that the translated command 144 is to perform a write action to the database 108. If the write action satisfies one of the conditions associated with the triggers 132, the gateway module 126 may automatically send one or more additional commands, such as the triggered command 146, along with the translated command 144 to the database 108.

At 914, a second command to be performed to a second database may be received. For example, in FIG. 5, the gateway module 126 may receive the second command 502 that is to be performed to the second database 302.

At 916, second configuration data associated with the second database may be identified. For example, in FIG. 5, in response to receiving the second command 502, the gateway module 126 may identify the second configuration data 308.

At 918, a second translated command corresponding to the second command may be created based on the second configuration data. For example, in FIG. 5, the gateway module 126 may create the second translated command 506 corresponding to the second command 502 based on the second configuration data 308.

At 920, the second translated command may be sent to the second database when the second translated command is valid for the second database. For example, in FIG. 5, the gateway module 126 may determine whether the second translated command 506 is valid for the portion of the second database 302 that is being accessed by the second translated command 506. If the gateway module 126 determines that the second translated command 506 is valid for the second database 302, the gateway module 126 may send the second translated command 506 to the second database 302.

Thus, the gateway module 126 may be used to enable access to two of more different types of databases, such as a relational database and a non-relational (e.g. NoSQL) database. The gateway module 126 may access configuration data that describes how each of the different types of databases may be accessed. When a command is received, the gateway module 126 may identify which database the command is to be sent to, identify configuration data associated with the identified database, and translate the command to create a translated command based on the configuration data. The gateway module 126 may determine whether the translated command is valid for the portion of the database that the translated command is accessing. If the translated command is valid, the gateway module 126 may send the translated command to the database. If the translated command is invalid, the gateway module 126 may send an error message to the software application that sent the command.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more processors configured with instructions to perform acts comprising:
receiving, at a gateway module, a command to perform an action to data that is stored in a field of a database;
determining configuration data associated with the database, the configuration data including one or more business rules that specify:
characteristics of the field that indicate a type of the data that is stored in the field, and
how to read from the field and write to the field;
determining, based on the configuration data, a set of commands to perform the action to the data;
determining that the set of commands is valid based on the characteristics of the field;
sending the set of commands to the database;
receiving a result of sending the set of commands to the database; and
determining that the result satisfies a condition to trigger an additional command that is associated with additional data stored in an additional field of the database.

2. The method of claim 1, wherein:
the action comprises reading the data from the field of the database; and
the configuration data includes information describing how to read the data from the field of the database.

3. The method of claim 1, wherein:
the action comprises modifying the data in the field of the database; and
the configuration data includes information describing how to modify the data in the field of the database.

4. The method of claim 1, wherein the one or more business rules further specify at least one of whether the field includes numeric values, whether the field includes non-numeric values, whether the field includes a binary value, or whether the field is modifiable.

5. The method of claim 1, wherein the command is written in a lightweight data interchange format.

6. The method of claim 1, the acts further comprising:
performing the additional command to the database.

7. The method of claim 1, the acts further comprising:
receiving, at the gateway module, a second command to perform a second action to a second field of a second database;
identifying second configuration data associated with the second database;

determining, based on the second configuration data, a second set of commands to perform the second action; and sending the second set of commands to the second database to perform the second action.

8. A computing device comprising:

one or more processors;

one or more computer-readable storage media storing instructions executable by the one or more processors to perform acts comprising:

receiving, from a software application, a first command to perform a first action on a portion of a database, wherein the first command is written in a first language that uses a lightweight data interchange format;

determining configuration data associated with the database;

translating the first command based on the configuration data to create a first translated command in a second language that uses a relational database language format;

determining that the first translated command is valid;

sending the first translated command to the database;

receiving a result of performing the first translated command to the database;

determining that the result of performing the first translated command satisfies a trigger condition associated with a triggered command;

performing the triggered command on a different portion of the database;

receiving a second command to perform a second action to a second portion of a second database, wherein the second database comprises a non-relational database, and wherein the second command is written in the first language;

translating the second command to create a second translated command in a third language that uses a non-relational database language format; and sending the second translated command to the second database.

9. The computing device of claim 8, wherein the configuration data includes one or more business rules specifying at least one of whether the portion of the database includes a numeric value, whether the portion of the database includes a non-numeric value, whether the portion of the database includes a binary value, or whether the portion of the database is modifiable.

10. The computing device of claim 8, wherein the second translated command comprises writing a description of an event to a log file, the description indicating that the portion of the database was modified.

11. The computing device of claim 8, wherein the second translated command comprises writing a timestamp based on a current time to a log file to indicate when the portion of the database was modified.

12. The computing device of claim 8, wherein determining that the first translated command is valid comprises:

determining that the first action includes modifying the portion of the database;

determining characteristics of data including a type of the data stored in the portion of the database, based on the configuration data; and determining that the first action is valid based on the characteristics of the data.

13. The computing device of claim 8, the acts further comprising:

receiving a third command to perform a third action;

determining that the third action is invalid; and sending an error message to the software application indicating that the third action is invalid.

14. One or more non-transitory computer-readable storage media storing instructions that are executable by one or more processors to perform acts comprising:

receiving, from an application, a command to perform an action to a first database of a plurality of databases, the plurality of databases including a relational database and a non-relational database, the first database comprising the relational database, wherein the command uses a lightweight data interchange format;

determining first configuration data associated with the first database, the first configuration data including one or more first business rules that specify how the first database is organized and how to access the first database;

creating a first translated command based at least partly on the command and the first configuration data;

sending the first translated command to the first database based on determining that the first translated command is valid;

determining that the first translated command was unsuccessful;

performing a corrective action to synchronize the relational database with the non-relational database;

determining second configuration data associated with a second database, the second configuration data including one or more second business rules that specify how the second database is organized and how to access the second database;

creating a second translated command based at least in part on the command and on the second configuration data; and sending the second translated command to the second database.

15. The one or more non-transitory computer-readable storage media of claim 14, wherein the acts further comprise:

receiving a result of sending the second translated command to the second database;

determining that the result satisfies a condition to trigger an additional command; and performing the additional command.

16. The one or more non-transitory computer-readable storage media of claim 14, wherein:

the first translated command is sent to the relational database; and the second translated command is sent to the non-relational database in parallel with sending the first translated command to the relational database.

17. The one or more non-transitory computer-readable storage media of claim 15, wherein the acts further comprise:

determining that the first translated command was successfully performed on the first database; and determining that the second translated command was successfully performed on the second database.

18. The one or more non-transitory computer-readable storage media of claim 14, wherein the acts further comprise:

performing a corrective action to synchronize the relational database with the non-relational database.

19. The one or more non-transitory computer-readable storage media of claim 14, the acts further comprising:

receiving a result of performing the first translated command from the first database; and sending the result to the application.

20. One or more non-transitory computer-readable storage media storing instructions that are executable by one or more processors to perform acts comprising:

receiving, from an application, a first command to be performed to a first database, wherein the first command is written in a lightweight data interchange format;

identifying configuration data associated with the first database;

creating a first translated command corresponding to the first command based on the configuration data;

determining that the first translated command is valid based on the configuration data;

determining that the first translated command satisfies a condition that triggers an additional command;

sending the first translated command to the first database, the first translated command modifying a first portion of the first database;

sending the additional command to the first database, the additional command modifying a second portion of the first database that is different from the first portion;

receiving, from the application, a second command to be performed to a second database;

creating a second translated command corresponding to the second command based on second configuration data associated with the second database; and sending the second translated command to the second database.

21. The one or more non-transitory computer-readable storage media of claim 20, wherein:

the first database comprises a plurality of additional databases; and the first translated command is sent to a subset of the plurality of additional databases based on the configuration data.

22. The one or more non-transitory computer-readable storage media of claim 20, the acts further comprising:

receiving a result of sending the second translated command to the second database;

determining that the result satisfies a condition to trigger a third command; and performing the third command.

23. The one or more non-transitory computer-readable storage media of claim 20, wherein:

the first database comprises a relational database; and the second database comprises a non-relational database.

24. The one or more non-transitory computer-readable storage media of claim 20, wherein the acts further comprise:

determining an action performed by the second command to the second database; and sending a fourth command to the second database based on the second command.

25. The one or more non-transitory computer-readable storage media of claim 21, wherein determining that the first translated command is valid based on the configuration data comprises:

identifying the first portion of the first database that is to be accessed by the first translated command;

determining characteristics associated with the first portion of the first database; and determining, based on the characteristics, that the first translated command performs an action that is compatible with the characteristics.

* * * * *